US 6,422,820 B1

(12) United States Patent
Anderson et al.

(10) Patent No.: US 6,422,820 B1
(45) Date of Patent: Jul. 23, 2002

(54) CORNER TANG FAN BLADE

(75) Inventors: Bernard Joseph Anderson, Danvers; Jeffrey Howard Nussbaum, Wilmington, both of MA (US); Juan Mario Gomez, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/607,490

(22) Filed: Jun. 30, 2000

(51) Int. Cl.$^7$ ................................................. F01D 5/32
(52) U.S. Cl. ............... 416/217; 416/193 A; 416/204 A; 416/220 R; 29/889.21
(58) Field of Search ......................... 416/204 R, 204 A, 416/215, 217, 218, 220 R, 222, 245 R, 193 A, 214 R, 214 A; 29/889.21, 889.22

(56) References Cited

U.S. PATENT DOCUMENTS 3,554,668 A  * 1/1971 Wagle ..................... 416/220 R
4,008,000 A  * 2/1977 Gradl et al. ................. 416/218
5,307,623 A  * 5/1994 Antuna et al. ........... 416/245 R

FOREIGN PATENT DOCUMENTS

GB           697687 A   *   9/1953          ................. 416/215
GB           731456 A   *   6/1955          ............. 416/220 R
JP           53-113902 A   *   10/1978          ............. 416/220 R

OTHER PUBLICATIONS

GE Aircraft Engines, "CF34–3 Fan Blade," in commercial use in USA for more than one year, single sheet drawing excerpt.

* cited by examiner

*Primary Examiner*—Christopher Verdier
(74) *Attorney, Agent, or Firm*—Nathan D. Herkamp; Francis L. Conte

(57) ABSTRACT

A fan blade includes perforated anchor tangs, one with inboard corners and the remainder without. The corners are disposed in a complementary seat in a rotor disk for limiting blade pivoting during assembly.

18 Claims, 4 Drawing Sheets

CORNER TANG FAN BLADE

BACKGROUND OF THE INVENTION

The present invention relates generally to gas turbine engines, and, more specifically, to fan blades therein.

A turbofan gas turbine engine configured for powering an aircraft in flight includes a row of large fan blades extending radially outwardly from a supporting rotor disk. The fan is surrounded by an annular casing supported in a corresponding nacelle. The casing defines an outer flowpath boundary for channeling air through the fan blades, and inner platforms are disposed at the root of the blades for defining the radially inner flowpath boundary.

Fan blades typically include a substantial amount of angular twist between the tip and root of the airfoil over which the air is channeled during operation. The airfoil tip thusly extends both axially and circumferentially due to the substantial twist, and correspondingly has a generally convex outer profile for maintaining a substantially uniform and small radial gap between the tip and the casing along the entire axial or chordal extent of the tip between its leading and trailing edges.

In one type of fan blade, a plurality of anchor tangs extend radially inwardly from the root end of the airfoil, below an integral platform thereat, and are interdigitated with a plurality of corresponding annular rims formed in the supporting disk. The tangs and rims have coaxially aligned apertures through which a corresponding retention pin is disposed for pivotally mounting each blade to the disk. This pin joint anchoring configuration is aligned with the stacking axis of the airfoil for carrying centrifugal loads generated during operation through the pin and into the supporting disk.

Conventional anchor tangs have generally semicircular inboard profiles at their radial lower ends to eliminate extraneous material and corresponding weight which does not contribute to the strength of the tangs for accommodating the substantial centrifugal loads generated during operation. Accordingly, the individual blades are thus free to pivot around the pins during assembly until the full complement row of fan blades is installed, with the adjacent fan blades then restraining pivotal movement of its neighbors.

Since fan blades have relatively thin tips and leading and trailing edges, the corresponding airfoil corners at the opposite ends of the tip are relatively thin and sharp. Excessive pivoting of the fan blade during assembly can cause either tip corner to impact the inner surface of the surrounding fan casing. This impact can cause damage either to the blade tip itself or to the inner surface of the fan casing, and is therefore undesirable.

In order to limit or restrain pivoting of the individual blades during assembly, a pivot limiting feature is typically incorporated in the blades. In one configuration, tip pivoting is prevented by providing extra material between a pair of the anchor tangs directly above the outer surface of the corresponding disk rim. This extra material defines a small gap with the rim perimeter and abuts the disk perimeter when the blade begins to tilt or pivot around its retention pin. In this way, the opposite ends of the blade tip are prevented from contacting the fan casing during assembly.

However, the extra material required between the two anchor tangs adds to the weight of the blade at the underside of the platform. That extra weight introduces a corresponding increase in centrifugal force during operation which correspondingly requires a suitably strong platform and anchor tangs for withstanding the loads. The centrifugal loads generate corresponding stresses in the tangs, pins, and disk during operation which affect the useful life of the fan.

Accordingly, it is desired to provide an improved fan having reduced blade weight and associated centrifugal forces during operation, with an improved anti-pivoting feature for assembly.

BRIEF SUMMARY OF THE INVENTION

A fan blade includes perforated anchor tangs, one with inboard corners and the remainder without. The corners are disposed in a complementary seat in a rotor disk for limiting blade pivoting during assembly.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
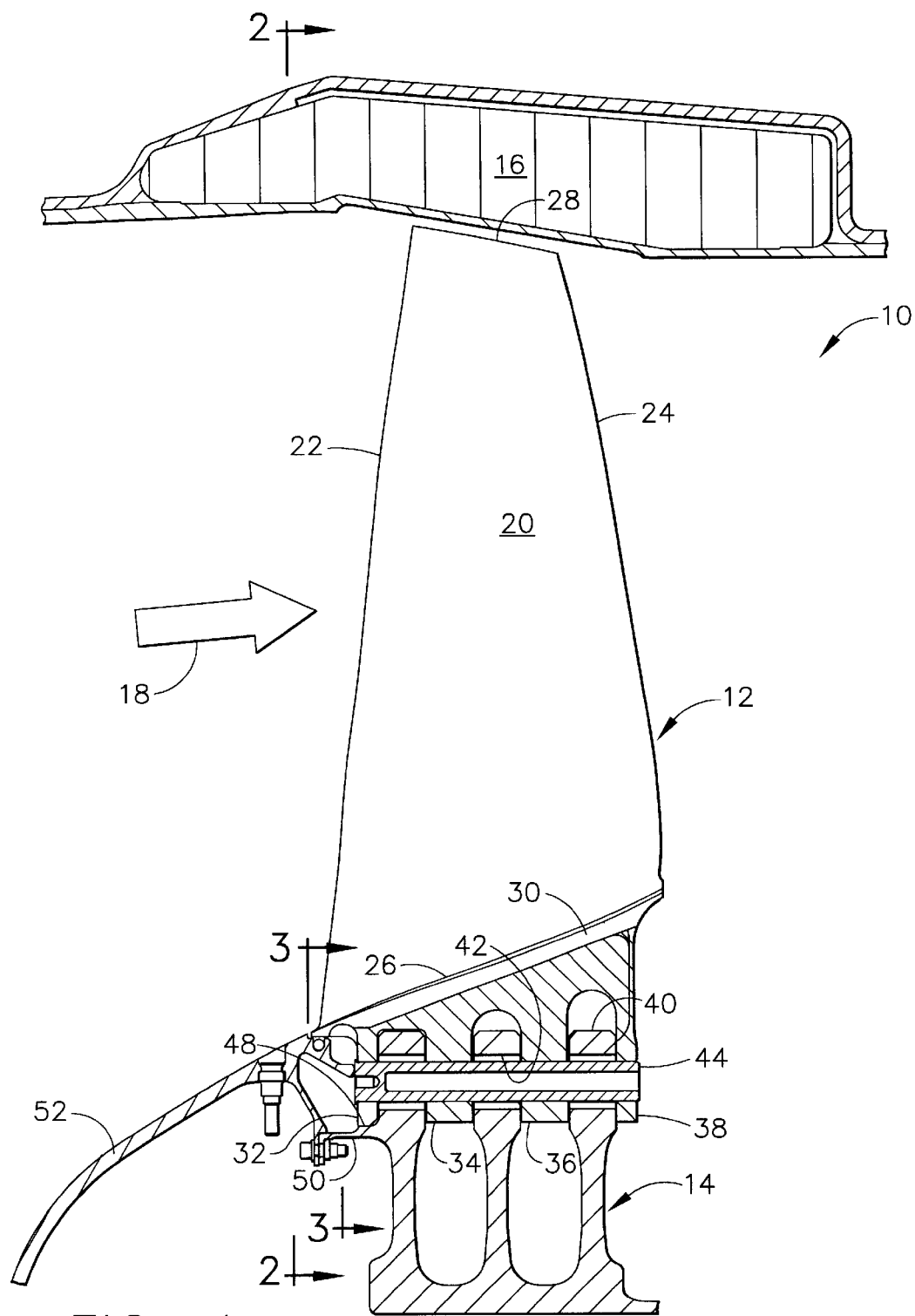
FIG. 1 is an axial sectional view of a portion of a fan in a turbofan gas turbine engine.

Illustrated in FIG. 1 is a fan 10 of exemplary turbofan gas turbine engine configured for powering an aircraft in flight. The fan is axisymmetrical about an axial centerline axis, and includes a row of fan blades 12 extending radially outwardly from a supporting rotor disk 14.

Figure 2:
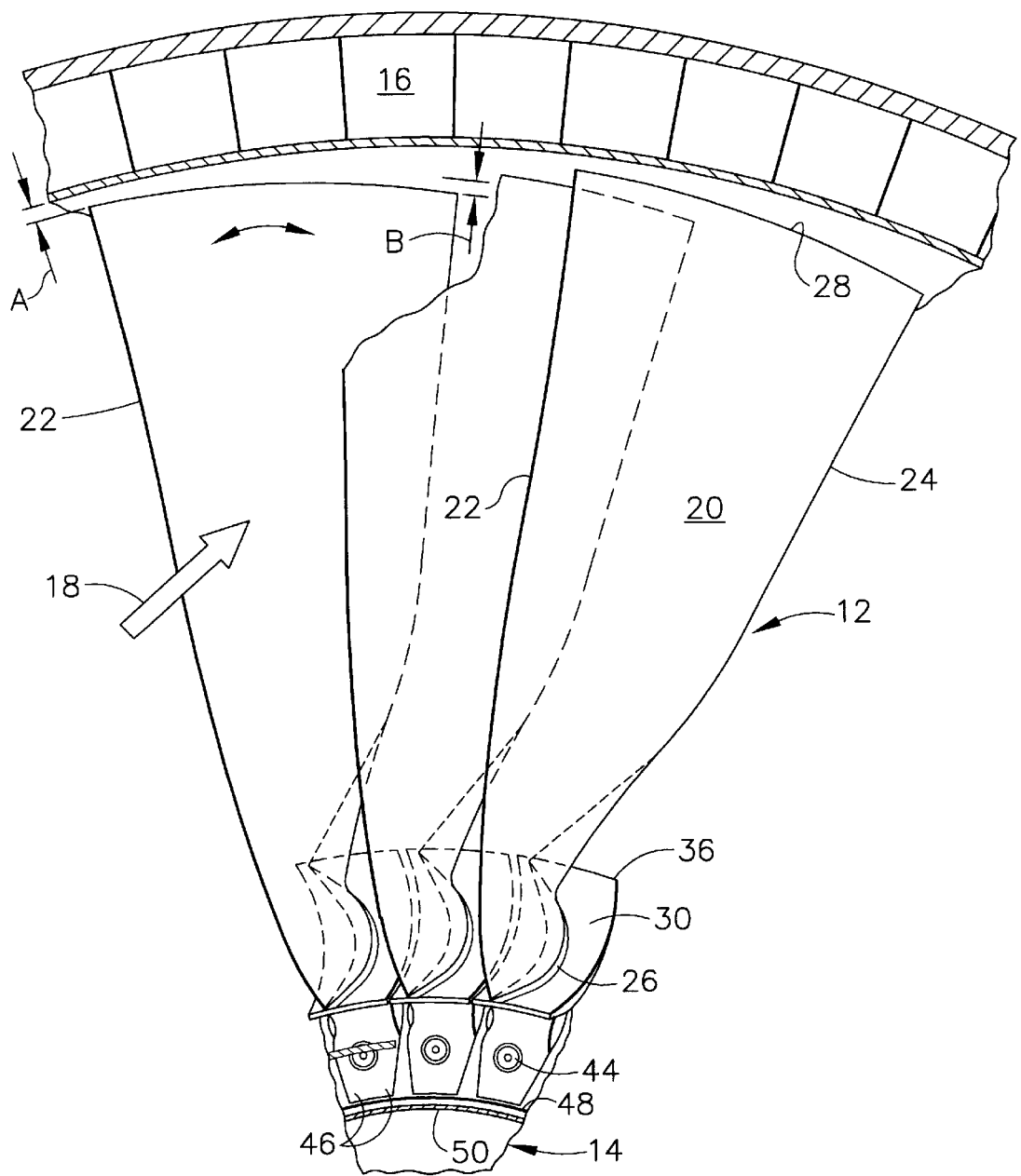
FIG. 2 is a forward-facing-aft view of a portion of the fan illustrated in FIG. 1 and taken along line 2—2 showing blade anchor tangs in accordance with an exemplary embodiment of the present invention.

As additionally shown in FIG. 2, the fan blades are spaced circumferentially apart from each other and within a surrounding fan casing 16 which defines the radially outer flowpath boundary through which ambient air 18 is channeled during operation. Each blade includes an airfoil 20 having opposite sides extending axially between leading and trailing edges 22, 24, and radially from root 26 to tip 28. The airfoil 20 is configured in a conventional manner for pressurizing the air 18 as it flows over the airfoils for producing thrust to power the aircraft in flight.

Each blade also includes a platform 30 which is typically integrally formed at the root of the airfoil and defines a portion of the radially inner flowpath boundary for the air 18.

As initially shown in FIG. 1, each blade further includes a plurality of axially spaced apart supporting root or anchor tangs 32–38 extending radially inwardly from the under side of the platform 30 which are configured to engage a plurality of axially spaced apart annular rims 40 extending radially outwardly from a common hub of the rotor disk 14. The tangs and rims are interdigitated, and include corresponding coaxially aligned apertures 42 therethrough for receiving a corresponding retaining pin 44. The pin 44 extends axially through the perforated tangs and rims for pivotally joining the individual blades to the rotor disk.

Figure 3:
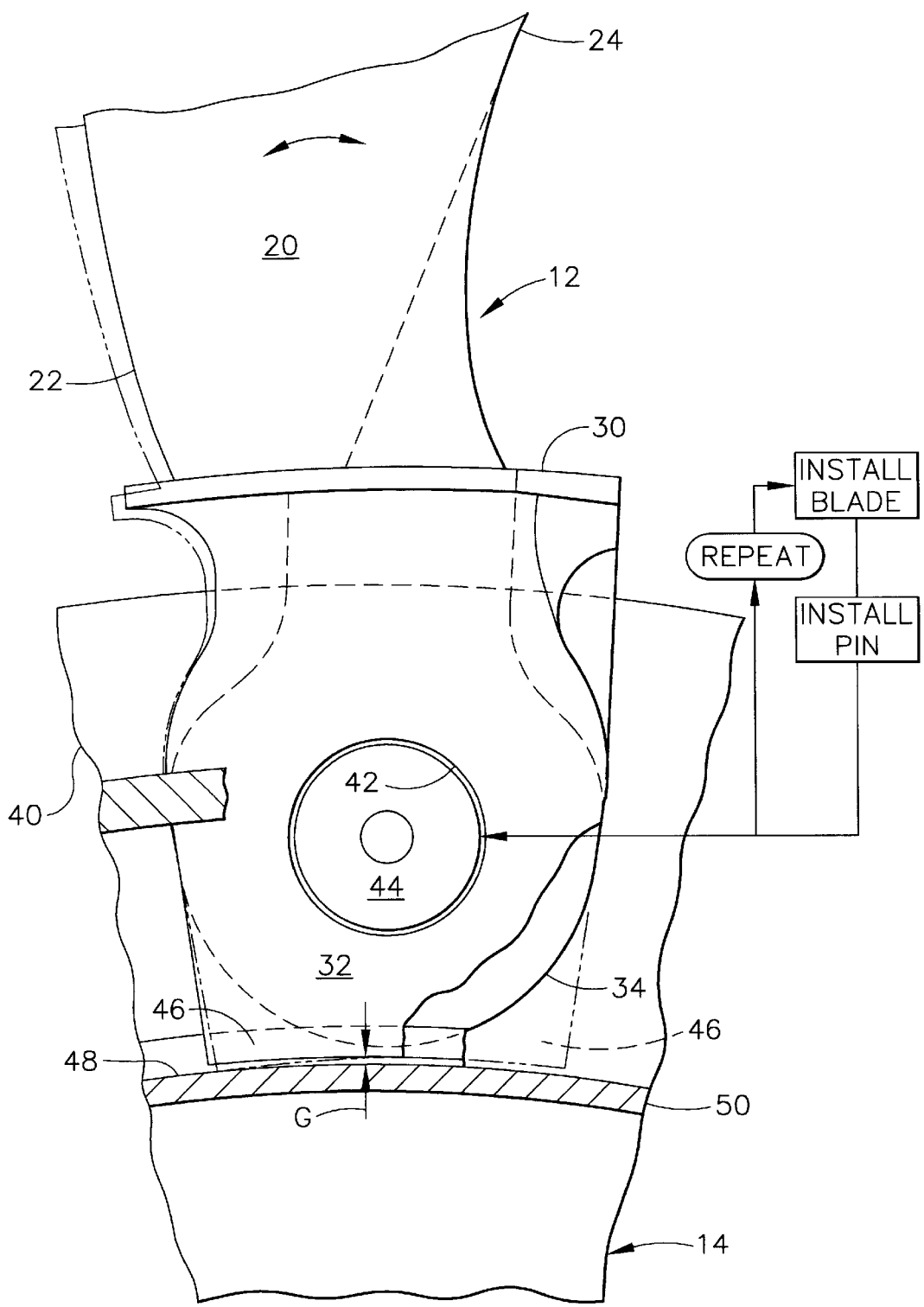
FIG. 3 is an enlarged radial front view of the anchor tangs illustrated in FIG. 1 and taken along line 3—3 in accordance with an exemplary configuration, and a flowchart method of assembly.
Figure 4:
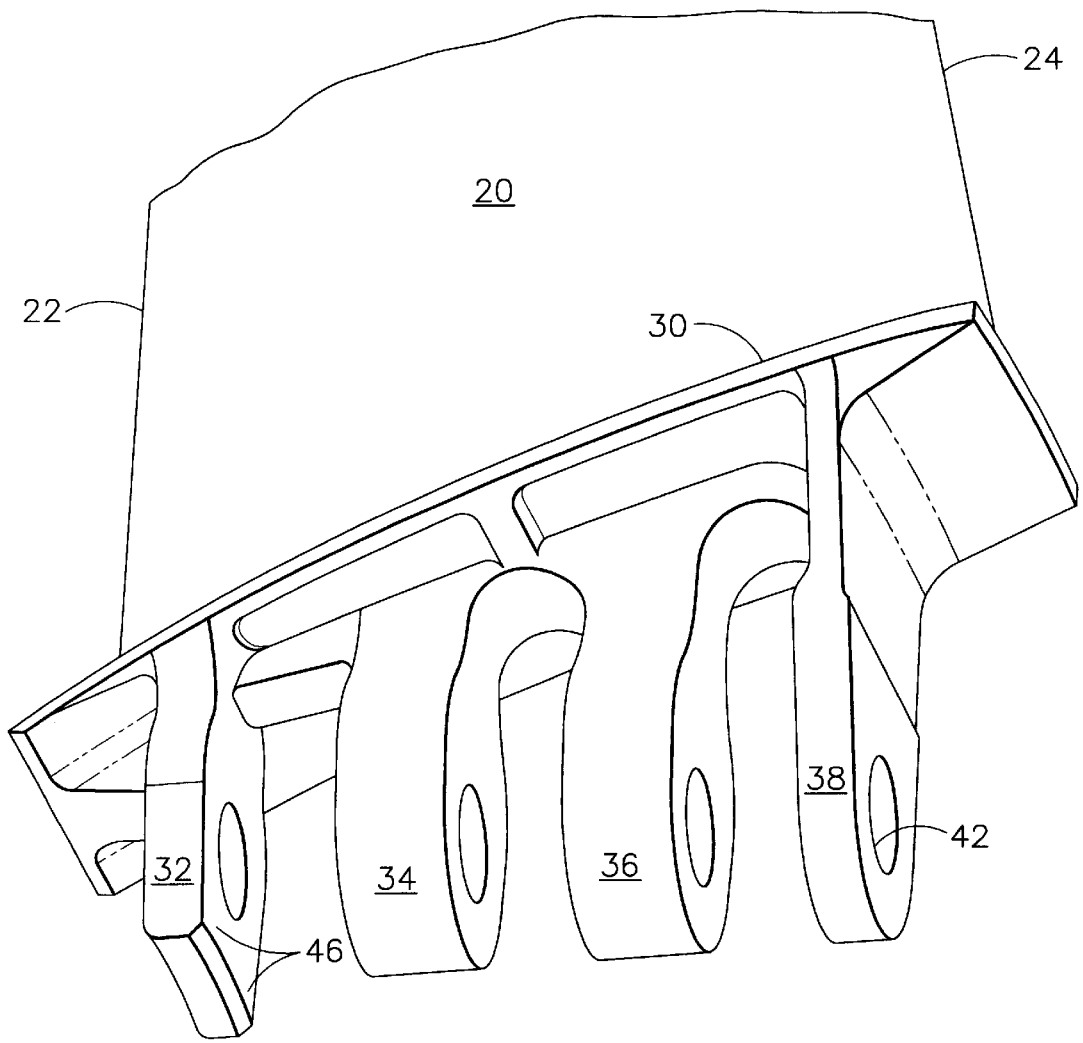
FIG. 4 is an isometric view of the anchor tangs of the fan blade illustrated in FIGS. 1–3 in accordance with an exemplary embodiment.

As shown in FIGS. 3 and 4, one of the tangs has circumferentially opposite inboard corners 46 which are configured for limiting rotational or pivoting movement of the blade around the pin 44 during assembly, whereas the remaining tangs are without any corresponding inboard corners.

In the exemplary embodiment illustrated in FIG. 4, there are four anchor tangs 32–38. These include a first or axially forward tang 32 at a forward end of the platform 30, a fourth or aft tang 38 at the axially opposite aft end of the platform. And, two exemplary middle tangs 34, 36 are disposed axially therebetween below the middle portion of the platform. The four tangs illustrated in FIG. 4 are interdigitated with the three disk rims 40 illustrated in FIG. 1 and receive a corresponding one of the retaining pins 44 axially therethrough for radially retaining each blade to the disk and carrying centrifugal loads through the pin and into the disk rims during operation.

The two limiting corners 46 are preferably provided only on the forward tang 32 to provide an anti-pivoting feature for limiting pivoting of the individual fan blades around the corresponding retaining pins during assembly. All three remaining tangs 34–38, which include the middle and aft tangs preferably have arcuate inboard ends which are generally semicircular and surround the inboard halves of the corresponding apertures 42.

In this way, the middle and aft tangs have limited material surrounding the apertures 42 effective for carrying the centrifugal loads generated during operation without adding extraneous weight which would undesirably add to centrifugal loads during operation.

Inboard corners on any of the tangs illustrated in FIG. 4, including the forward tang 32, provide little, if any, additional strength to the tangs for accommodating centrifugal loads during operation. However, the corners are provided solely on the forward tang for introducing the anti-pivoting feature for substantially reducing overall weight of the fan blade, reducing corresponding centrifugal loads, and correspondingly reducing centrifugal stress during operation for prolonging the useful life of the fan blade.

As shown in FIG. 1, the platform 30 is preferably an integral component of the blade and is disposed between the airfoil 20 and the tangs 32–38 in a unitary or one-piece construction which may be formed by forging and suitable machining in an exemplary embodiment. The platform 30 is inclined radially outwardly from the leading edge 22 toward the trailing edge 24 for accelerating the air 18 as it is channeled between the fan blades.

Correspondingly, the retaining pin 44 is not inclined but extends axially parallel to the centerline axis of the engine. Accordingly, the anchor tangs increase in radial height in turn from the shortest forward tang 32 to the successively larger middle tangs 34, 36 to the largest aft tang 38. The four tangs thusly increase in length or height to match the aft inclination of the platform 30 which itself remains as thin as practical for reducing overall weight of the blade.

As shown in FIG. 4, the forward and aft tangs 32, 38 extend radially outwardly to integrally engage respective ends of the platform 30, and preferably are substantially as wide in the circumferential direction as the platform itself. However, the second tang 34 which directly adjoins the forward tang 32 is circumferentially narrower than the forward tang 32 at the respective junctions with the underside of the platform 30.

Similarly, the third tang 36 which directly adjoins the fourth tang 38 on one side thereof and the second tang 34 on the opposite side thereof is similarly circumferentially narrower than the first and fourth tangs 32, 38 at the junctions with the underside of the platform 30.

In this way, the pair of middle tangs 34–36 disposed between the forward and aft tangs 32–38 may substantially converge in circumferential thickness prior to engaging the underside of the platform 30 for substantially reducing the volume of material between the platform and the middle tangs for reducing weight. Since the anti-pivoting feature is not incorporated at the underside of the platform between any of the tangs, the additional material which would otherwise be required therefor is eliminated, and the platform and tangs may be tailored for maximizing strength with minimum weight for accommodating the centrifugal loads generated during operation.

As shown in FIG. 4, the anti-pivoting feature is instead introduced by adding the two external corners 46 at the inboard end of the forward tang 32. As shown in FIG. 1, the forwardmost rim 40 of the disk adjoins the aft side of the forward tang 32, and includes an annular step or seat 48 which receives in close tolerance the forward tang corners 46 for limiting pivotal movement of the blade around the pin.

This is illustrated in more particularity in FIG. 3 wherein the inboard end of the forward tang 32 is generally rectangular in configuration in which the two corners 46 adjoin each other at a concave arcuate inner surface with a radius conforming to the outer radius or diameter of the seat 48 to provide a relatively small radial gap G therebetween. The radial gap G may be as small as about a few mils so that any pivoting movement of the blade around the pin 44 during assembly will cause either one of the two corners to radially abut the seat 48 and limit any further pivoting of the blade.

As shown in FIG. 2, angular twisting of the airfoil 20 around its span axis causes the airfoil tip 28 to extend in part axially and in part circumferentially inside the annular casing 16. The airfoil tip 28 must therefore have a generally convex outboard profile for maintaining a substantially uniform radial gap A, B between the tip and casing from leading to trailing edge of the blade. Any pivoting of the blade around the retaining pin 44 will decrease the leading edge gap A while increasing the trailing edge B, or vice versa depending upon the direction of pivoting.

In order to prevent undesirable contact between the sharp edges of the airfoil tip and the surrounding casing 16 during operation, the forward tang corners 46 will instead abut the seat 48 specifically provided therefor and prevent excessive pivoting around the pin which would otherwise cause the blade tip to impact the surrounding casing during assembly.

FIG. 3 illustrates in flowchart form an exemplary method of assembling the several fan blades 12 in turn in the corresponding rotor disk having the rims 40 being complementary to the anchor tangs 32–38. The anchor seat 48 is provided in one of the disk rims, preferably the forward disk rim corresponding with the shortest forward tang 32. That shortest forward tang 32 is correspondingly provided with the two inboard corners 46 for effecting the general rectangular configuration thereof, with all remaining tangs 34–38 having semicircular or arcuate inboard edges without any inboard corners circumferentially therealong.

In this way, the individual fan blades may be installed into the disk by interdigitating the four tangs 32–38 with the three rims 40. The retaining pin may then be inserted through the coaxially aligned apertures 42 of the tangs end rims. The tang corners 46 are thusly positioned closely around the annular seat 48 which permits either corner to abut the seat to limit pivoting of the blade around the pin in either pivoting direction.

Correspondingly, the blade tip 28 as shown in FIG. 2 is prevented from impacting the surrounding casing which protects both the blade tip and the casing from any impact damage during assembly. Upon final assembly of the last fan blade in the full complement of blades in the row, the circumferentially adjoining blade platforms 30 will then abut each other and prevent excessive pivoting movement of the individual fan blades around their corresponding retaining pins. The tang corners 46 then become extraneous, and therefore it is desired to minimize their weight for reducing the centrifugal loads generated therefrom during operation, and the resulting centrifugally generated stress in the tangs, pins, and disk rims.

As shown in FIG. 1, the platform 30 is inclined in the aft direction and increases in radius between the forward and aft ends thereof. Correspondingly, the four tangs increase in radial height in the aft direction, with the forward tang 32 being disposed below the airfoil leading edge 22, the aft tang 38 being disposed below the airfoil trailing edge 24, and the two middle tangs 34–36 being disposed mid-chord therebetween.

The platform as illustrated in FIG. 4 may accordingly be relatively thin for reducing weight thereof and may include stiffening ribs on the underside thereof for maintaining strength with minimum weight. The web of material joining the middle tangs 34–36 to the underside of the platform 30 may be relatively thin for substantially reducing weight while carrying centrifugal loads radially through the middle tangs into the supporting rims.

Although the tang corners 46 could be provided on any one of the four tangs illustrated in FIG. 4, they are preferably provided at the forward tang 32 to cooperate with an available annular supporting flange 50 integrally joined to the forward face of the forward rim 32. The fan includes a conventional streamlining spinner 52 shown in FIG. 1 which is fixedly joined coaxially to the supporting flange 50 by a row of retaining fasteners. The flange 50 is cylindrical where it extends axially forwardly from the forward rim 32, and the annular seat 48 may be readily sized in outer diameter to provide a relatively small radial gap with the corners 46 of the forward tang 32.

The anti-pivoting corners 46 are thusly defined at the radially innermost portion of the fan blade at the inboard end of the forward tang 32, and are disposed at a relatively low or small radius from the engine centerline axis. The additional weight introduced by the small corners 46 is relatively small and experiences relatively low centrifugal loads when rotated during operation.

The anti-pivoting corners 46 themselves thusly introduce minimal additional weight, centrifugal load, and resulting centrifugal stress during operation and, the corners permit a significant reduction in weight of the platform itself at the junction between the four tangs which may now be designed solely for maximizing strength with minimal weight without regard for introducing anti-pivoting capability thereat.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A fan blade comprising an airfoil and a plurality of supporting anchor tangs extending therefrom with aligned apertures therethrough for receiving a retaining pin, and one of said tangs has circumferentially opposite inboard corners and another one of said tangs is without corresponding inboard corners.

2. A fan blade comprising an airfoil and a plurality of supporting anchor tangs extending therefrom with aligned apertures therethrough for receiving a retaining pin, and a first one of said tangs has circumferentially opposite inboard corners for limiting pivoting of said blade around said pin during assembly, and remaining ones of said tangs have arcuate inboard ends.

3. A blade according to claim 2 further comprising an integral platform disposed between said airfoil and tangs, and inclined outwardly from said first tang over said remaining tangs.

4. A blade according to claim 3 wherein a second tang adjoining said first tang is narrower than said first tang at junctions with said platform.

5. A blade according to claim 4 wherein a third tang adjoining said second tang on one side, and adjoining a fourth tang on an opposite side is narrower than said first and fourth tangs at junctions with said platform.

6. A blade according to claim 5 wherein:
said airfoil includes opposite leading and trailing edges;
said first tang is disposed inboard of said leading edge, and said fourth tang is disposed inboard of said trailing edge; and
said platform is inclined outwardly between said first and fourth tangs.

7. A blade according to claim 5 in combination with a supporting rotor disk having a plurality of annular rims interdigitated with said tangs, and receiving said retaining pin axially therethrough for pivotally joining said blade to said disk, and a first one of said rims adjoins said first tang and includes an annular seat receiving said first tang corners for limiting pivotal movement of said blade around said pin.

8. A combination according to claim 7 further comprising:
an annular supporting flange integrally joined to said first rim, and including said tang seat at the junction therebetween; and
a spinner fixedly joined to said supporting flange.

9. A fan blade having perforated anchor tangs, one with circumferentially opposite inboard corners and the remainder without corresponding inboard corners.

10. A blade according to claim 9 wherein said tangs include a forward tang having said inboard corners, an aft tang without said corners, and a middle tang therebetween without said corners.

11. A blade according to claim 10 wherein said middle and aft tangs have arcuate inboard ends.

12. A blade according to claim 11 further comprising an airfoil with leading and trailing edges integrally joined to said tangs at a platform therebetween, and said forward tang is disposed inboard of said leading edge, and said aft tang is disposed inboard of said trailing edge.

13. A blade according to claim 12 wherein:
said airfoil includes a root at said platform, and a tip at an opposite span end thereof; and
said platform is inclined from said leading edge outwardly toward said trailing edge, and said middle and aft tangs are longer than said forward tang.

14. A blade according to claim 13 wherein said middle tang is narrower than said forward and aft tangs at said platform.

15. A blade according to claim 13 further comprising a pair of said middle tangs disposed between said forward and aft tangs.

16. A blade according to claim 15 in combination with a supporting rotor disk having a plurality of annular rims interdigitated with said tangs, and receiving a retaining pin axially therethrough for pivotally joining said blade to said disk.

17. A combination according to claim 16 wherein a first one of said rims adjoins said forward tang and includes an annular seat receiving said forward tang corners for limiting pivotal movement of said blade around said pin.

18. A method of assembling a fan blade having perforated anchor tangs and a rotor disk having complementary rims, comprising:

providing an annular seat at one of said rims;

providing inboard corners in one of said anchor tangs, and the remaining tangs without inboard corners;

interdigitating said tangs with said rims; and installing a retaining pin through said tangs and rims, with one of said tang corners abutting said seat to limit pivoting of said blade about said pin.

* * * * *